(12) United States Patent
Kubota et al.

(10) Patent No.: US 12,148,178 B2
(45) Date of Patent: Nov. 19, 2024

(54) WORKPIECE DETECTION DEVICE AND WORKPIECE DETECTION METHOD

(71) Applicant: AMADA CO., LTD., Kanagawa (JP)

(72) Inventors: Teruyuki Kubota, Kanagawa (JP); Takeshi Washio, Kanagawa (JP); Satoshi Takatsu, Kanagawa (JP); Naohumi Miura, Kanagawa (JP); Shuuhei Terasaki, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 340 days.

(21) Appl. No.: 17/616,739

(22) PCT Filed: Jun. 3, 2020

(86) PCT No.: PCT/JP2020/021864
§ 371 (c)(1),
(2) Date: Dec. 6, 2021

(87) PCT Pub. No.: WO2020/250761
PCT Pub. Date: Dec. 17, 2020

(65) Prior Publication Data
US 2022/0335642 A1 Oct. 20, 2022

(30) Foreign Application Priority Data

Jun. 12, 2019 (JP) ................................ 2019-109550

(51) Int. Cl.
*G06T 7/60* (2017.01)
*B25J 9/16* (2006.01)
(Continued)

(52) U.S. Cl.
CPC ............... *G06T 7/70* (2017.01); *B25J 9/1694* (2013.01); *G06T 1/0014* (2013.01); *G06T 7/60* (2013.01);
(Continued)

(58) Field of Classification Search
CPC ... G06T 7/70; G06T 1/0014; G06T 7/60; G06T 2207/30164; G06T 7/75;
(Continued)

(56) References Cited

U.S. PATENT DOCUMENTS

| 2015/0125035 A1* | 5/2015 | Miyatani | G06T 7/75 |
| | | | 382/103 |
| 2017/0237955 A1* | 8/2017 | Koyama | H04N 9/3188 |
| | | | 348/745 |

(Continued)

FOREIGN PATENT DOCUMENTS

| EP | 1589483 A2 * | 10/2005 | ............ B25J 9/1697 |
| JP | 2018-120388 A | 8/2018 | |

OTHER PUBLICATIONS

Extended European Search Report for corresponding EP Application No. 20822129.1 issued Jul. 11, 2022.
(Continued)

*Primary Examiner* — Shefali D Goradia
*Assistant Examiner* — D J Dhooge
(74) *Attorney, Agent, or Firm* — Renner, Otto, Boisselle & Sklar, LLP

(57) ABSTRACT

A pattern matching unit carries out a pattern matching between a photographed image obtained by photographing a workpiece with a monocular camera and a first plurality of models having a plurality of sizes and a plurality of angles, and selects a model having a size and an angle with the highest degree of matching. A primary detection unit detects a position and an angle of an uppermost workpiece based on the selected model. An actual load height calculation unit calculates an actual load height of the uppermost workpiece based on a hand height. A secondary detection unit re-detects the position and the angle of the uppermost workpiece based on a model having a size and an angle with the highest degree of matching selected by carrying out a pattern (Continued)

matching between the photographed image and a second plurality of models selected or newly created based on the actual load height.

6 Claims, 9 Drawing Sheets

(51) Int. Cl.
| | | |
|---|---|---|
| *G06T 1/00* | (2006.01) | |
| *G06T 7/00* | (2017.01) | |
| *G06T 7/10* | (2017.01) | |
| *G06T 7/20* | (2017.01) | |
| *G06T 7/30* | (2017.01) | |
| *G06T 7/70* | (2017.01) | |
| *G06V 10/24* | (2022.01) | |
| *G06V 10/75* | (2022.01) | |

(52) U.S. Cl.
CPC .......... *G06V 10/247* (2022.01); *G06V 10/751* (2022.01); *G06T 2207/30164* (2013.01); *G06V 2201/06* (2022.01)

(58) Field of Classification Search
CPC ..... B25J 9/1694; B25J 9/1697; G06V 10/247; G06V 10/751; G06V 2201/06; G01B 11/022; B21D 5/004; B21D 43/105; G05B 2219/37422
See application file for complete search history.

(56) References Cited

U.S. PATENT DOCUMENTS

| | | | |
|---|---|---|---|
| 2018/0004188 A1* | 1/2018 | Yamaguchi | ................ B25J 9/16 |
| 2018/0144498 A1* | 5/2018 | Sugahara | .................. G06T 7/74 |
| 2019/0096083 A1* | 3/2019 | Arano | ....................... G06T 7/70 |

OTHER PUBLICATIONS

International Search Report for corresponding Application No. PCT/JP2020/021864, mailed Aug. 18, 2020.
Written Opinion for corresponding Application No. PCT/JP2020/021864, mailed Aug. 18, 2020.

* cited by examiner

WORKPIECE DETECTION DEVICE AND WORKPIECE DETECTION METHOD

TECHNICAL FIELD

The present invention relates to a workpiece detection device and a workpiece detection method for detecting a workpiece loaded on a mounting place.

BACKGROUND ART

A workpiece holding robot may hold a workpiece loaded on a mounting place such as a pallet and transport the workpiece to a processing machine such as a press brake (see Patent Literature 1). A workpiece detection device photographs the workpiece arranged at the mounting place with a camera so as to detect the position of the workpiece.

CITATION LIST

Patent Literature

Patent Literature 1: Japanese Patent Application Laid-Open Publication No. 2018-120388

SUMMARY

A workpiece detection device may photograph a loaded workpiece with a monocular camera so as to detect the position of the workpiece. When the workpiece detection device tries to detect the position of the workpiece based on a photographed image obtained by the monocular camera, the position of the workpiece cannot be detected with high accuracy because the height of the workpiece cannot be accurately measured. As a result, a workpiece holding robot may fail to hold the workpiece, and inappropriate holding may cause process stop or process failure.

An object of one or more embodiments is to provide a workpiece detection device and a workpiece detection method capable of detecting a position of a workpiece with high accuracy based on a photographed image obtained by photographing the workpiece loaded on a mounting place with a monocular camera.

According to a first aspect of the one or more embodiments, there is provided a workpiece detection device including a trapezoid correction unit configured to perform trapezoid correction on photographed image data obtained by photographing workpieces loaded on a mounting place with a monocular camera, a pattern matching unit configured to carry out a first pattern matching between an image of the trapezoid-corrected photographed image data and a first plurality of models that show images of a workpiece to be detected and have a plurality of sizes and a plurality of angles so as to select a model having a size and an angle with the highest degree of matching, a primary detection unit configured to detect a position and an angle of an uppermost workpiece from among the loaded workpieces based on the model selected by the pattern matching unit, an actual load height calculation unit configured to calculate an actual load height of the uppermost workpiece based on a hand height detected by a workpiece holding robot when a gripper of the workpiece holding robot is positioned above the uppermost workpiece based on the position and the angle of the uppermost workpiece detected by the primary detection unit, and a secondary detection unit configured to re-detect the position and the angle of the uppermost workpiece based on a model having a size and an angle with the highest degree of matching that the pattern matching unit selects by carrying out a second pattern matching between the image of the trapezoid-corrected photographed image data and a second plurality of models that are either selected from among the first plurality of models based on the actual load height or newly created based on the actual load height, the second plurality of models being less than the first plurality of models.

According to a second aspect of the one or more embodiments, there is provided a workpiece detection method including photographing workpieces loaded on a mounting place with a monocular camera, performing trapezoid correction on photographed image data obtained by photographing the workpieces with the monocular camera, selecting a model having a size and an angle with the highest degree of matching by carrying out a first pattern matching between an image of the trapezoid-corrected photographed image data and a first plurality of models that show images of a workpiece to be detected and have a plurality of sizes and a plurality of angles, detecting a position and an angle of an uppermost workpiece from among the loaded workpieces based on the model selected by the first pattern matching, calculating an actual load height of the uppermost workpiece based on a hand height detected by a workpiece holding robot when a gripper of the workpiece holding robot is positioned above the uppermost workpiece based on the detected position and angle of the uppermost workpiece, selecting a model having a size and an angle with the highest degree of matching by carrying out a second pattern matching between the image of the trapezoid-corrected photographed image data and a second plurality of models that are either selected from among the first plurality of models based on the actual load height or newly created based on the actual load height, the second plurality of models being less than the first plurality of models, and re-detecting the position and the angle of the uppermost workpiece based on the model selected by the second pattern matching.

According to the workpiece detection device and the workpiece detection method of the one or more embodiments, the position of the workpiece can be detected with high accuracy based on the photographed image obtained by photographing the workpiece loaded on the mounting place with the monocular camera.

DESCRIPTION OF EMBODIMENTS

Figure 1:
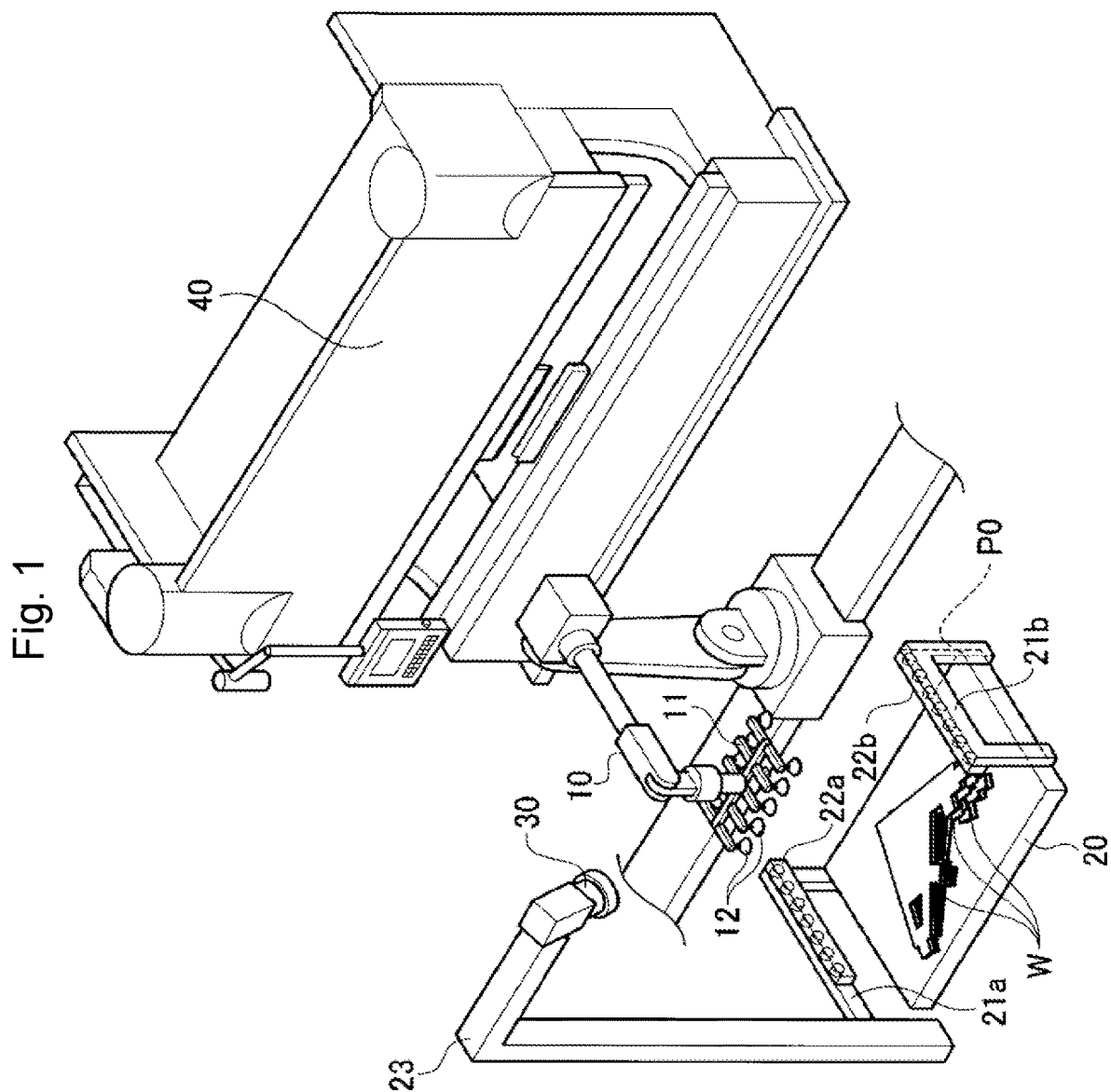
FIG. 1 is a perspective view showing a configuration example of a processing system in which a workpiece loaded on a mounting place is held by a workpiece holding robot and transported to a processing machine to process the workpiece.

Hereinafter, a workpiece detection device and a workpiece detection method of the one or more embodiments will be described with reference to the attached drawings. In FIG. 1, a plurality of workpieces W are loaded on a pallet 20 that is an example of a mounting place. Frames 21a and 21b are arranged on both sides of the pallet 20. The frame 21a includes one vertical frame and a horizontal frame connected to the upper end portion of the vertical frame. The frame 21b includes a pair of vertical frames and a horizontal frame connected to the upper end portions of the pair of vertical frames.

Lighting fixtures 22a and 22b are attached to opposite surfaces of the horizontal frames of the frames 21a and 21b, respectively. The lighting fixtures 22a and 22b include, for example, a plurality of light emitting diodes (LEDs). The lighting fixtures 22a and 22b irradiate the workpieces W loaded on the pallet 20 with illumination beams.

An L-shaped support column 23 consisting of a vertical frame extending to a predetermined height and a horizontal frame connected to the upper end portion of the vertical frame is attached to the frame 21a. A camera 30 is attached to the distal end of the support column 23 (the horizontal frame). The camera 30 is a monocular camera. The camera 30 photographs the pallet 20 and the workpiece W from a position further from a workpiece holding robot 10 in a separating direction than directly above the center of the pallet 20. In other words, the camera 30 photographs the pallet 20 and the workpiece W from a position diagonally above. As a result, the camera 30 does not interfere with the operation of the workpiece holding robot 10 in holding and transporting the workpiece W loaded on the pallet 20.

When the camera 30 photographs the workpiece W loaded on the pallet 20, it is preferable that the workpiece W is irradiated with the illumination beams by the lighting fixtures 22a and 22b. If the workpiece W is irradiated with the illumination beams, the edge of the workpiece W is clarified, thereby the position of the workpiece W can be easily detected when the position of the workpiece W is detected by a pattern matching described below.

The articulated workpiece holding robot 10 is arranged between the pallet 20 and a press brake 40 that is an example of a processing machine. The workpiece holding robot 10 includes a gripper 11 at its distal end for sucking the workpiece W. The gripper 11 includes a plurality of suction pads 12. The gripper 11 sucks and holds one uppermost workpiece W, and transports the workpiece W to the press brake 40 for processing. The workpiece holding robot 10 and the press brake 40 constitute a processing system.

Figure 2:
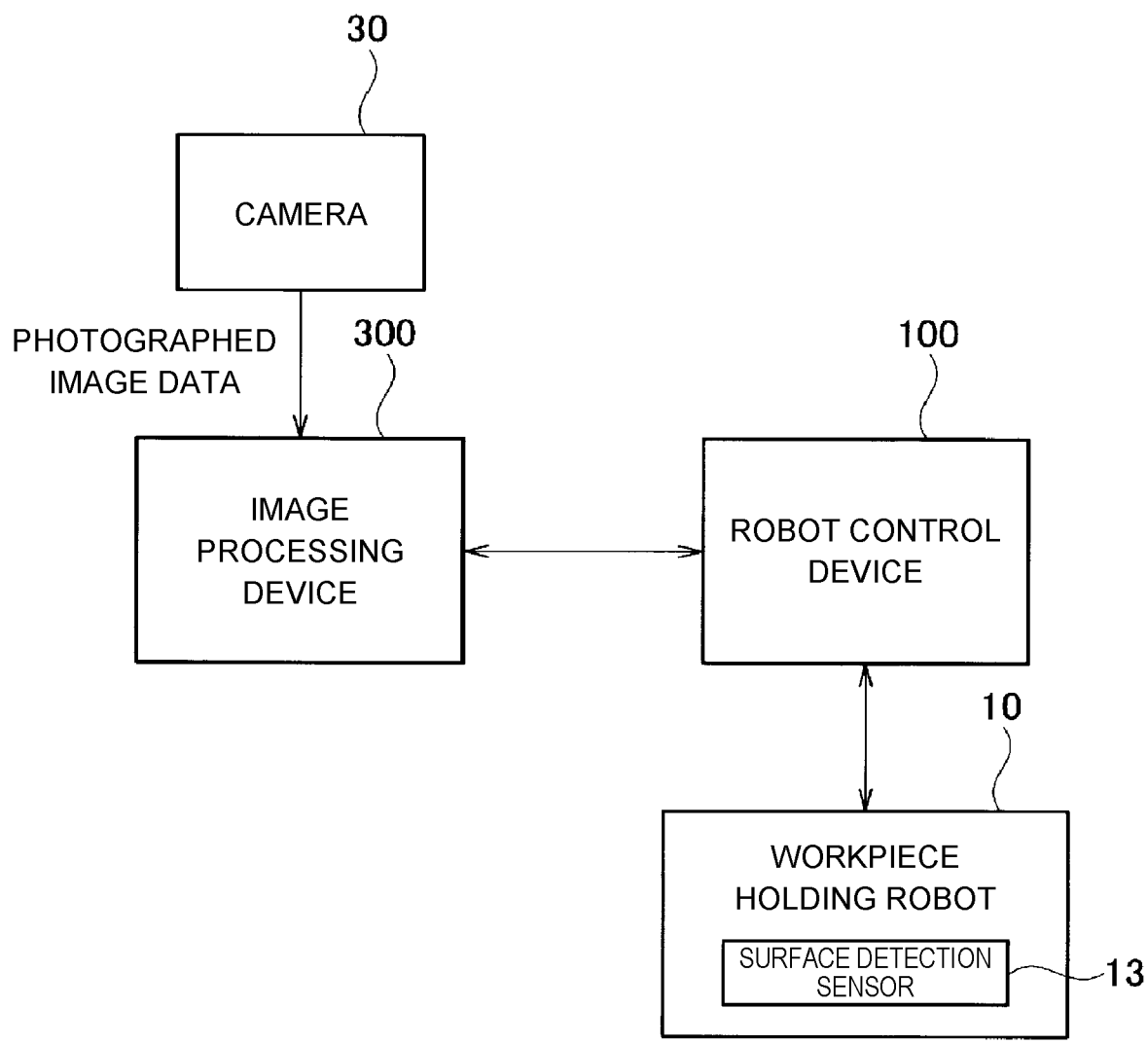
FIG. 2 is a block diagram showing a configuration example of the processing system including a workpiece detection device of one or more embodiments.

As shown in FIG. 2, the photographed image data photographed with the camera 30 is supplied to an image processing device 300. As will be described below, the image processing device 300 detects a position and an angle of the uppermost workpiece W on the pallet 20 based on the photographed image data, and supplies information of the detected position and angle to a robot control device 100. The image processing device 300 functions as the workpiece detection device of the one or more embodiments.

The robot control device 100 controls the workpiece holding robot 10 so as to hold the workpiece W on the pallet 20 based on the position information of the workpiece W. The workpiece holding robot 10 is provided with a surface detection sensor 13 for detecting the surface of the workpiece W when the gripper 11 is located above the workpiece W.

The image processing device 300 and the robot control device 100 can be constituted by a computer device. By allowing the robot control device 100 to have the function of the image processing device 300, the robot control device 100 and the image processing device 300 may be integrated.

Figure 3:
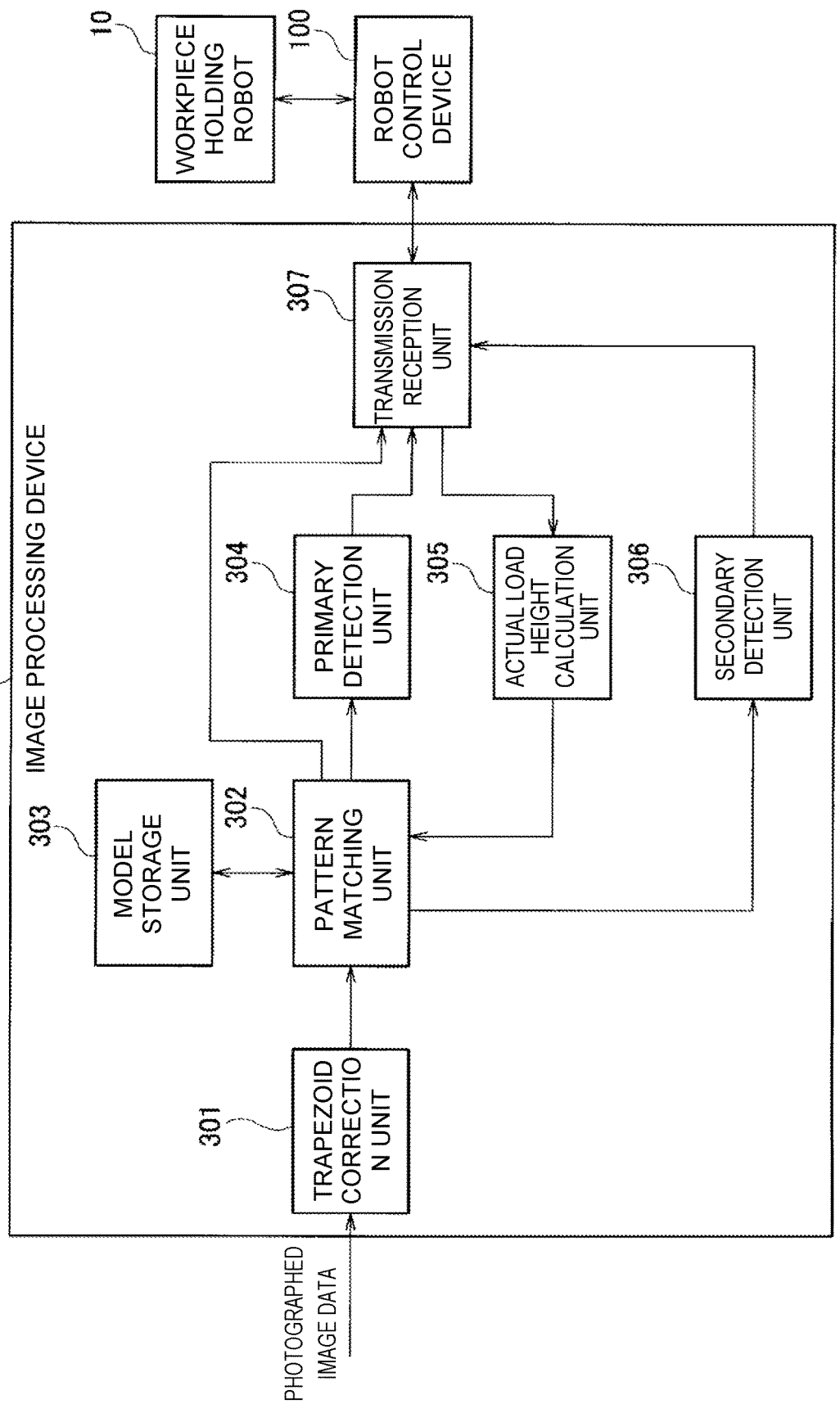
FIG. 3 is a block diagram showing a specific configuration example of the workpiece detection device of the one or more embodiments.

FIG. 3 shows a specific configuration of the image processing device 300. The image processing device 300 is provided with a trapezoid correction unit 301, a pattern matching unit 302, a model storage unit 303, a primary detection unit 304, an actual load height calculation unit 305, a secondary detection unit 306, and a transmission reception unit 307.

Figure 4:
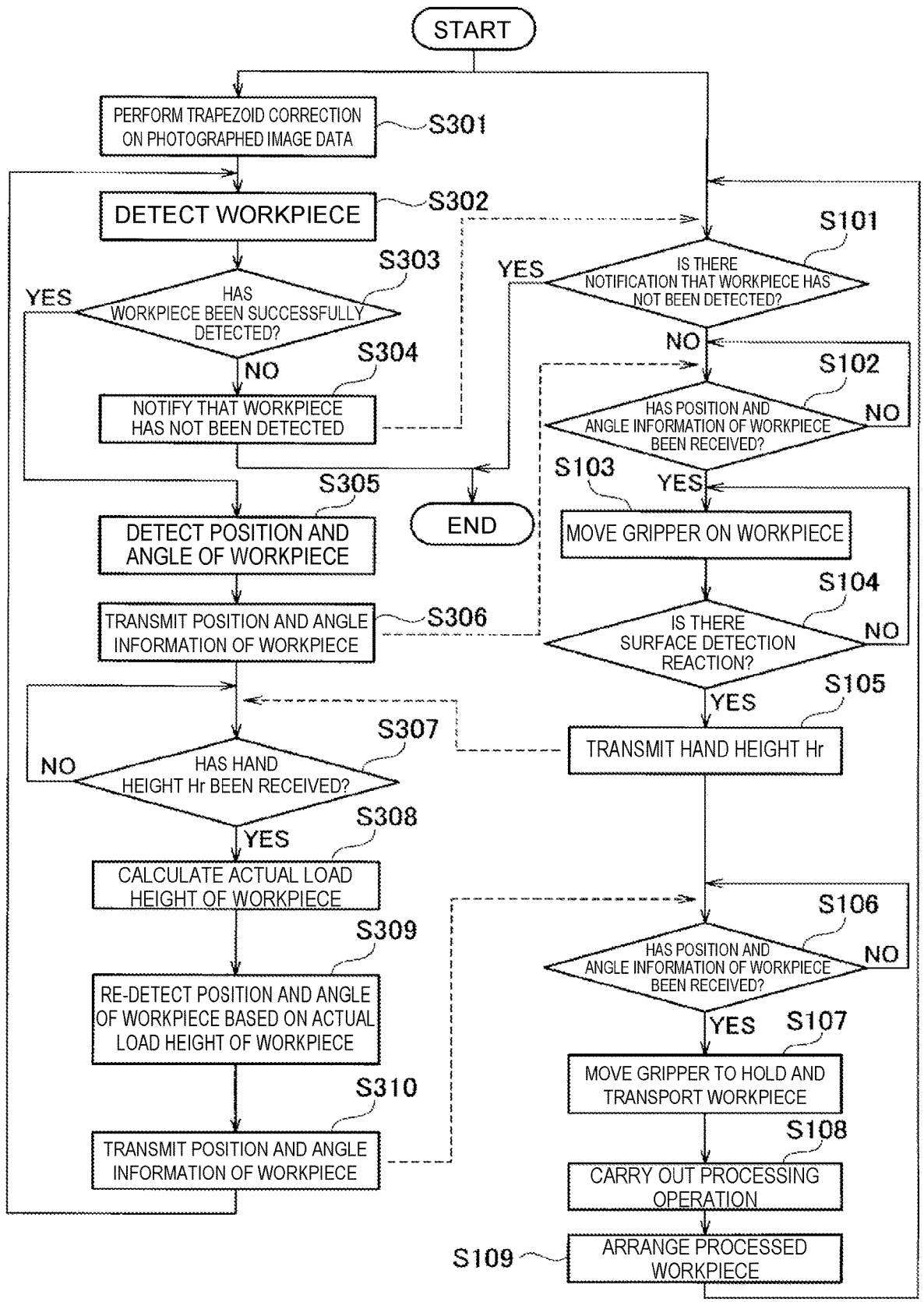
FIG. 4 is a flowchart showing processing in which the workpiece detection device of the one or more embodiments cooperates with a robot control device to detect the workpiece.

The flowchart shown in FIG. 4 shows processing executed by the image processing device 300 and the robot control device 100 that are cooperated with each other. In FIG. 4, when the image processing device 300 and the robot control device 100 start processing, the trapezoid correction unit 301 performs trapezoid correction on the photographed image data supplied from the camera 30 in step S301. If the input of the photographed image data is continued, the trapezoid correction unit 301 continuously performs the trapezoid correction on the photographed image data.

The camera 30 outputs photographed image data that are digital signals, or an unillustrated A/D converter generates photographed image data by converting photographed image signals into digital signals if the camera 30 outputs photographed image signals using analog signals. The trapezoid correction unit 301 performs trapezoid correction on the photographed image data by using a parameter obtained based on a calibration operation carried out in advance.

In step S302, the pattern matching unit 302 carries out a pattern matching (a first pattern matching) between an image of the trapezoid-corrected photographed image data and models of the workpiece W stored in the model storage unit 303 so as to select a model having a size and an angle with the highest degree of matching.

Figure 5:
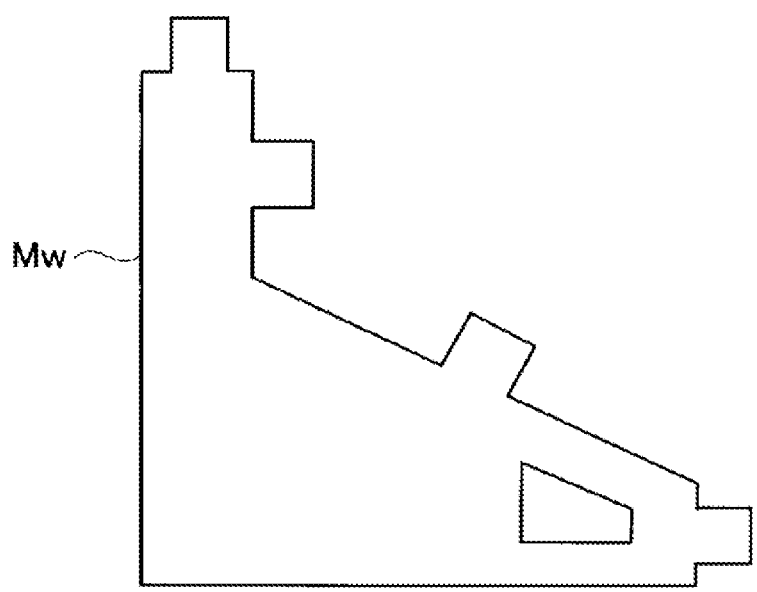
FIG. 5 is a diagram showing a model of a workpiece to be detected.
Figure 6:
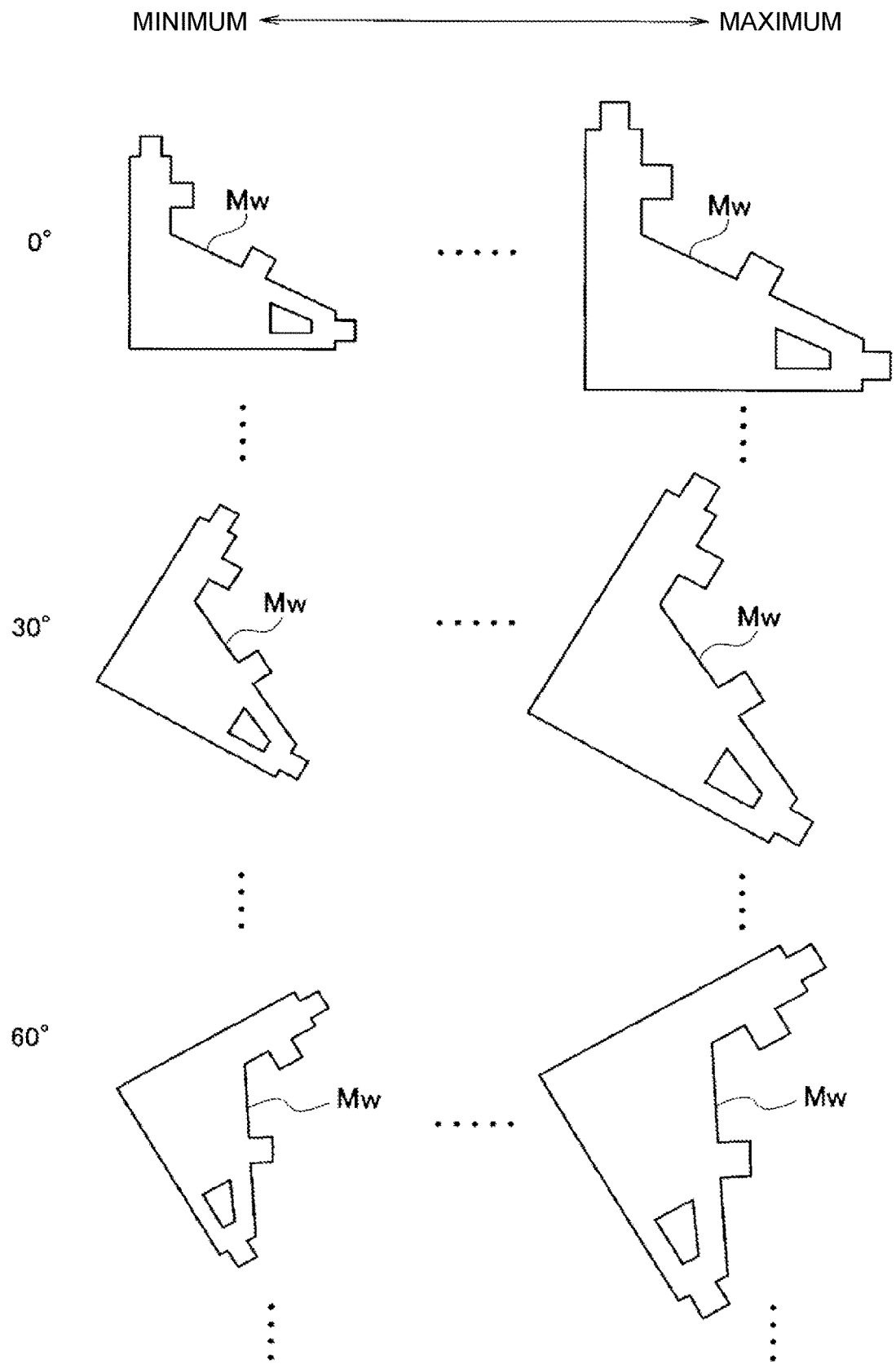
FIG. 6 is a diagram showing models having a plurality of sizes and a plurality of angles stored in a model storage unit included in the workpiece detection device of the one or more embodiments.

Specifically, the pattern matching unit 302 selects the model having the highest degree of matching as follows. Taking the workpiece W having a shape as shown in FIG. 1 as an example, a model Mw shown in FIG. 5 is stored in the model storage unit 303. The model Mw consists of a line image showing the workpiece W. As shown in FIG. 6, in the model storage unit 303, a plurality of models Mw are stored in which the size of the model Mw shown in FIG. 5 is changed in a stepwise manner and further the model Mw of each size is rotated by a predetermined angle.

The size of the photographed image of the workpiece W photographed with the camera 30 is the smallest when one workpiece W is arranged on the pallet 20 and that workpiece W is photographed, and is the largest when a maximum number of workpieces W are loaded on the pallet 20 and the uppermost workpiece W is photographed. Therefore, the model storage unit 303 may store the models Mw having sizes different in a stepwise manner from the model Mw corresponding to the photographed image of the smallest workpiece W to the model Mw corresponding to the photographed image of the largest workpiece W. The model storage unit 303 stores the plurality of models Mw obtained by rotating the model Mw of each size by the predetermined angle. Assuming that the predetermined angle is 1 degree, the model storage unit 303 stores the respective 360 pieces of models Mw obtained by rotating the model Mw of each size by 1 degree.

The model storage unit 303 stores not only the models Mw shown in FIGS. 5 and 6 but also the models Mw of the workpieces W having various shapes that may be loaded on the pallet 20.

Figure 7:
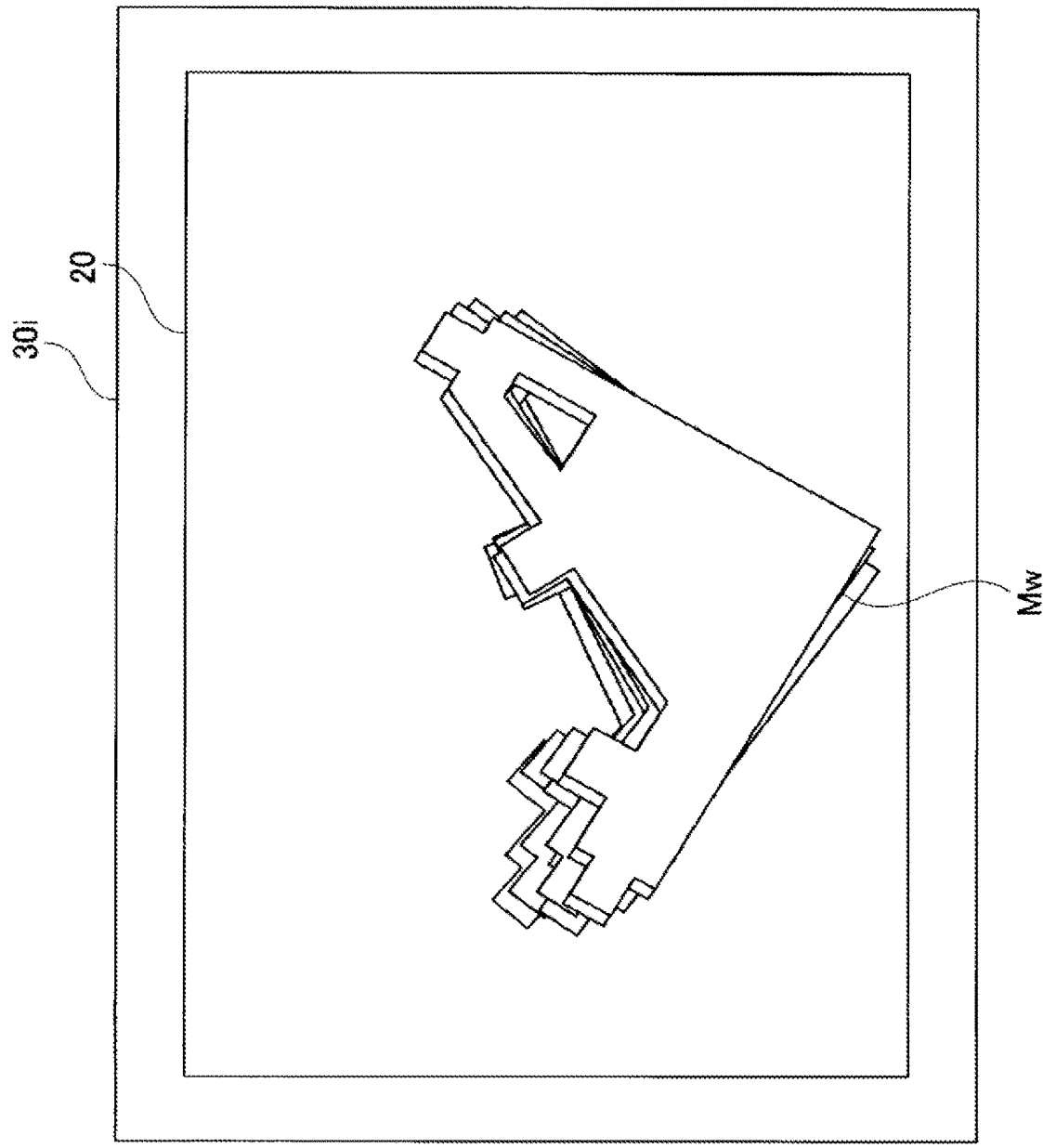
FIG. 7 is a diagram showing a state in which a pattern matching unit included in the workpiece detection device of the one or more embodiments performs a pattern-matching between the workpiece loaded on the mounting place and models.

In FIG. 7, a photographed image 30i obtained by the camera 30 includes an image of the workpiece W loaded on the pallet 20. As a result of the pattern matching in step S302 by the pattern matching unit 302, the model Mw closest to the size and the angle of the image of the uppermost workpiece W is matched and selected. The selection of the model Mw closest to the image of the uppermost workpiece W allows the uppermost workpiece W to be detected.

In FIG. 4, the pattern matching unit 302 determines in step S303 whether or not the workpiece W has been successfully detected by the matching of the model Mw. If the detection of the workpiece W is not successful (NO), the transmission reception unit 307 notifies the robot control device 100 that the workpiece W has not been detected in step S304, and the image processing device 300 ends the processing. In FIG. 4, the broken arrow lines indicate that information or data is transmitted from the image processing device 300 to the robot control device 100 and from the robot control device 100 to the image processing device 300.

In step S101, the robot control device 100 determines whether or not there is a notification that the workpiece W has not been detected, and if there is a notification that the workpiece W has not been detected (YES), the processing is ended.

If the robot control device 100 controls the workpiece holding robot 10 to hold all the workpieces W arranged on the pallet 20 and transport all the workpieces W to the press brake 40, a state is attained in which no workpiece W is arranged on the pallet 20. When all the workpieces W are transported to the press brake 40 and a state is attained in which no workpiece W exists on the pallet 20, the workpiece W is not detected. Therefore, when the state is attained in which no workpiece W exists on the pallet 20, a state is attained in which the workpiece W is not successfully detected in step S303.

Figure 8:
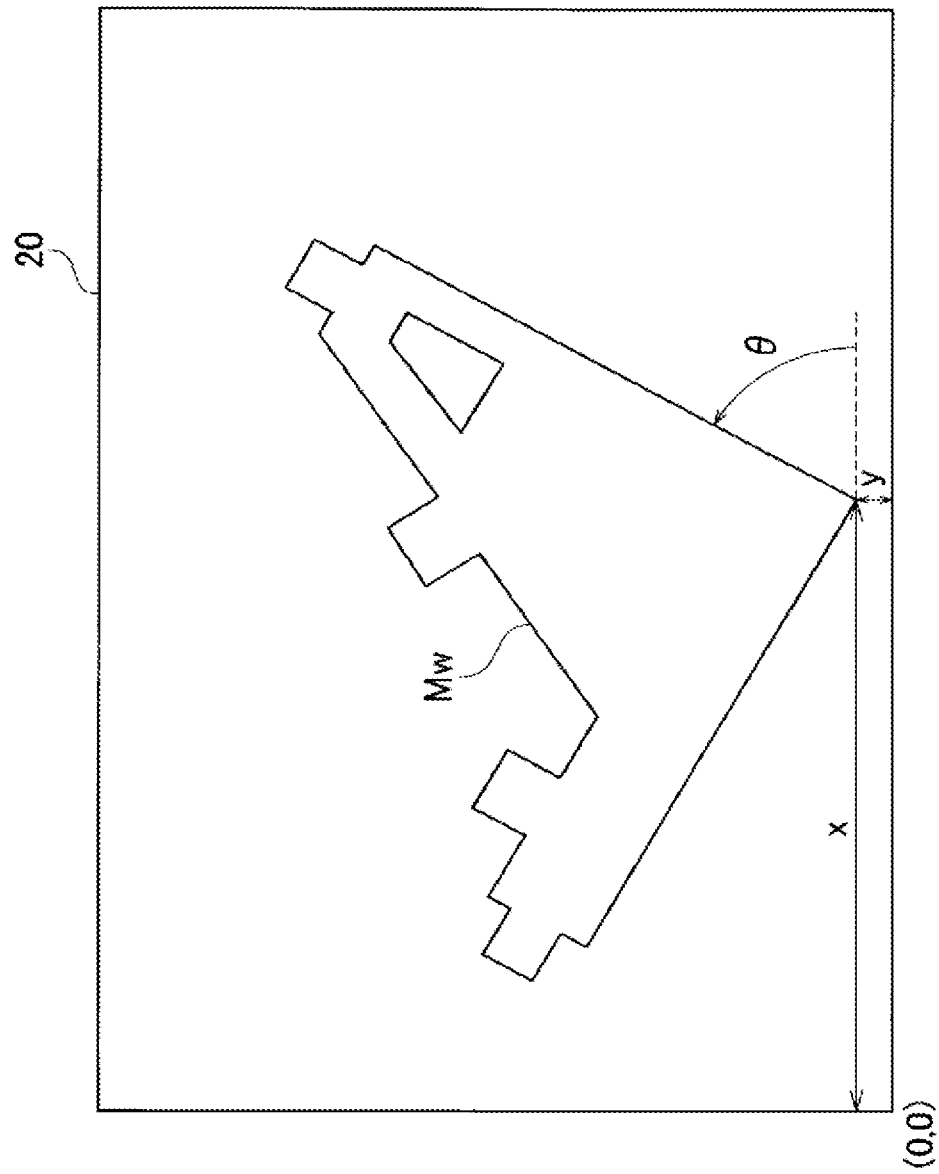
FIG. 8 is a diagram showing a definition of a position and an angle of the workpiece.

If the workpiece W is successfully detected in step S303 (YES), the primary detection unit 304 detects the position and the angle of the workpiece W in step S305. As shown in FIG. 8, the primary detection unit 304 detects the position (x, y) of the corner portion of the model Mw selected as described above as the position of the workpiece W on the pallet 20. The primary detection unit 304 defines the angle of the selected model Mw as the angle θ of the workpiece W on the pallet 20. The position of a corner portion P0 of the pallet 20 shown in FIG. 1 is the origin (0,0) of the photographed image obtained by photographing the pallet 20 with the camera 30.

The correlation between the height of the workpiece W, strictly speaking, the position of the upper surface of the workpiece W in the vertical direction, and the size of the photographed image of the workpiece W has been obtained in advance. In step S305, the primary detection unit 304 detects a height h of the workpiece W based on the size of the matched model Mw. In this manner, the primary detection unit 304 detects the position and angle information (x, y, θ, h) of the uppermost workpiece W including each piece of information of the planar position, the position in the vertical direction, and the angle thereof.

It should be noted that since the height h of the workpiece W is detected based on the size of the model Mw, the detected height h is not necessarily the actual height that is accurately detected. Since the height h includes an error, the position (x, y) of the workpiece W is not necessarily the actual position that is accurately detected.

In step S306, the transmission reception unit 307 transmits the position and angle information (x, y, h, θ) of the workpiece W to the robot control device 100. In step S102, the robot control device 100 determines whether or not the position and angle information (x, y, θ, h) of the workpiece W has been received. If the position and angle information (x, y, θ, h) of the workpiece W is not received (NO), the robot control device 100 repeats the processing of step S102.

Figure 9:
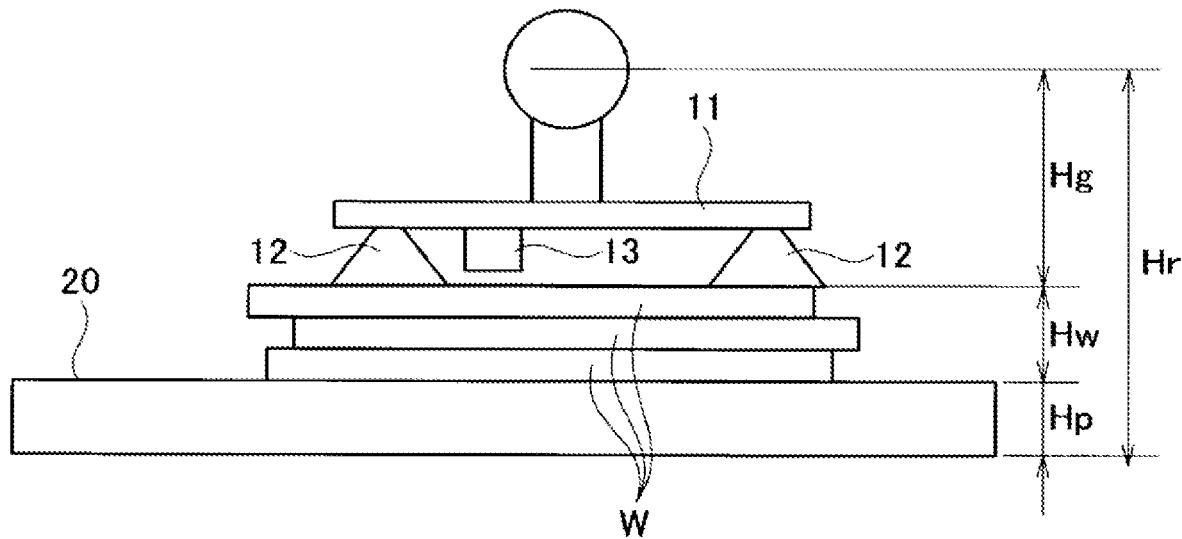
FIG. 9 is a conceptual side view for describing a method of calculating an actual load height of the workpiece.

If the robot control device 100 receives the position and angle information (x, y, θ, h) of the workpiece W in step S102 (YES), the robot control device 100 moves the gripper 11 above the workpiece W, rotates the gripper 11 by an angle θ, and lowers the gripper 11 at a low speed so as to approach the height h in step S103. As shown in FIG. 9, when the gripper 11 approaches the uppermost workpiece W, the surface detection sensor 13 detects the surface of the workpiece W. The surface detection sensor 13 may be a contact type surface detection sensor or a non-contact type surface detection sensor.

In step S104, the robot control device 100 determines whether or not there is a surface detection reaction by the surface detection sensor 13 from the workpiece holding robot 10. If there is no surface detection reaction (NO), the robot control device 100 repeats the processing of steps S103 and S104. If there is a surface detection reaction in step S104 (YES), the robot control device 100 transmits a hand height Hr, which is received from the workpiece holding robot 10 and shown in FIG. 9, to the image processing device 300 in step S105.

In step S307, the transmission reception unit 307 determines whether or not the hand height Hr has been received. If the hand height Hr is not received (NO), the transmission reception unit 307 repeats the processing of step S307. If the transmission reception unit 307 receives the hand height Hr (YES), the actual load height calculation unit 305 calculates an actual load height Hw of the workpiece W in step S308. In FIG. 9, assuming that the height of the gripper 11 is Hg and the height of the upper surface of the pallet 20 from the installation surface is Hp, the actual load height calculation unit 305 calculates the actual load height Hw of the workpiece W based on the following equation (1):

$$Hw = Hr - Hg - Hp \ldots \quad (1)$$

The secondary detection unit 306 re-detects the position and the angle of the uppermost workpiece W in step S309. Specifically, the actual load height Hw detected by the actual load height calculation unit 305 is supplied to the pattern matching unit 302. The pattern matching unit 302 selects a part of the models Mw based on the actual load height Hw from among the models Mw of all sizes stored in the model storage unit 303 for detecting the workpiece W shown in FIG. 1. Assuming that the models Mw of all sizes are a first plurality of models Mw, the models Mw selected based on the actual load height Hw are a second plurality of models Mw that are less than the first plurality of models Mw.

Instead of selecting the part of the models Mw based on the actual load height Hw, the pattern matching unit 302 may create a new model Mw having a size based on the actual load height Hw. In the method of selecting the part of the models Mw based on the actual load height Hw, the processing speed can be increased although it is necessary to store a multitude of models Mw of different sizes in the model storage unit 303. In the method of creating a new model Mw based on the actual load height Hw, the capacity of the model storage unit 303 can be reduced although the processing speed is slowed down.

It is preferable that the part of models Mw are models Mw of a plurality of angles having a plurality of sizes corresponding to a limited range that is from a height obtained by adding an error to the actual load height Hw to a height obtained by subtracting the error from the actual load height Hw. It is preferable that the error added to or subtracted from the actual load height Hw is a thickness of the workpiece W. When the new model Mw is created based on the actual load height Hw, a plurality of models Mw having a plurality of sizes and a plurality of angles may be created based on one or more models Mw within a limited range and stored in advance in the model storage unit 303. It should be noted that since the approximate angle of the workpiece W is detected by the primary detection unit 304, the second plurality of models Mw do not have to include the models Mw of all angles. The second plurality of models Mw may only include the models Mw of angles included in the range of predetermined angles centered on the angle detected by the primary detection unit 304.

The pattern matching unit 302 carries out a pattern matching (a second pattern matching) with the image of the photographed image data by using the second plurality of models Mw selected or newly created as described above so as to select a model Mw having a size and an angle with the highest degree of matching. By the pattern matching in step S309, the model Mw closest to the size and the angle of the image of the uppermost workpiece W is matched and selected, and the uppermost workpiece W is detected more accurately.

In the same manner as in FIG. 8, in step S309, the secondary detection unit 306 detects the position (x, y) of the corner portion of the selected model Mw as the position of the workpiece W on the pallet 20, and defines the angle of the selected model Mw as the angle θ of the workpiece W on the pallet 20. Since the position (x, y) and the angle θ of the corner portion detected by the secondary detection unit 306 are different from the position (x, y) and the angle θ of the corner portion detected by the primary detection unit 304, the position and the angle are referred to as the position (x', y') and the angle θ'. As the result of re-detection by the secondary detection unit 306, the position and angle information (x', y', θ', Hw) of the workpiece W can be obtained.

In step S310, the transmission reception unit 307 transmits the position and angle information (x', y', θ', Hw) generated by the secondary detection unit 306 to the robot control device 100, and returns the processing to step S302.

In step S106, the robot control device 100 determines whether or not the position and angle information (x', y', θ', Hw) has been received. If the position and angle information (x', y', θ', Hw) is not received (NO), the robot control device 100 repeats the processing of step S106.

If the position and angle information (x', y', θ', Hw) is received (YES), the robot control device 100 moves or rotates (or moves and rotates) the gripper 11 based on the position and angle information (x', y', θ', Hw) in step S107. Further, in step S107, the robot control device 100 controls the workpiece holding robot 10 so as to suck and hold the workpiece W by the suction pads 12 and transport the workpiece W to the press brake 40.

Figure 10:
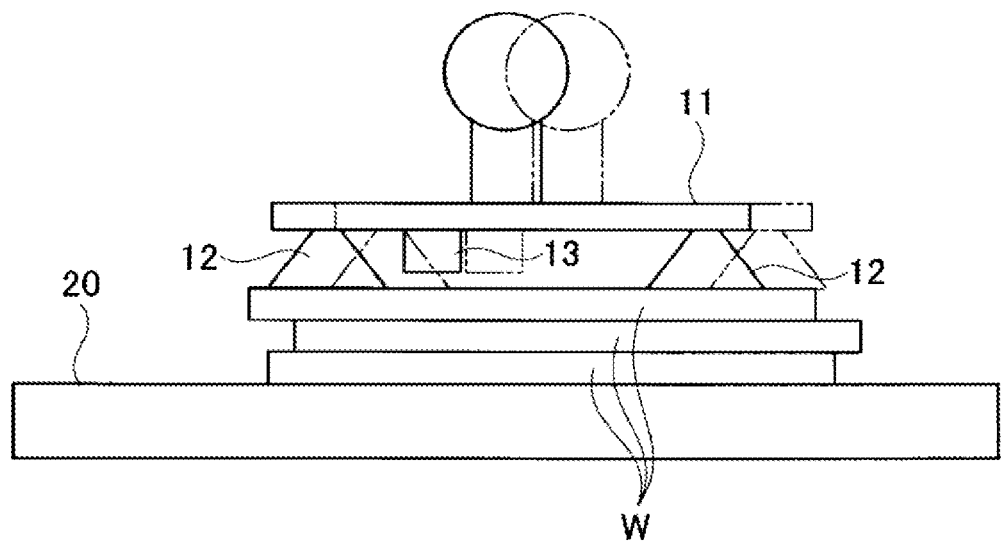
FIG. 10 is a conceptual side view showing a state in which a gripper of the workpiece holding robot is moved based on the position and the angle of the workpiece that have been re-detected.

As shown in FIG. 10, even if the position of the gripper 11 moved above the workpiece W in step S103 is deviated from an appropriate position as shown by the alternate long and short dash lines, the gripper 11 is corrected to an appropriate position shown by the solid lines in step S107 so as to hold the workpiece W.

In step S108, the robot control device 100 controls the workpiece holding robot 10 so as to carry out the processing operation of the workpiece W in cooperation with the press brake 40. It should be noted that the press brake 40 is controlled by an unillustrated NC device. When the processing operation of the workpiece W is completed, the robot control device 100 transports the processed workpiece W to a predetermined mounting position in step S109, releases the suction of the suction pads 12, arranges the processed workpiece W on the mounting position, and returns the processing to step S101.

As described above, even though the camera 30 is a monocular camera, the position of the workpiece W can be detected with high accuracy. Therefore, the workpiece holding robot 10 rarely holds an inappropriate position of the workpiece W and causes process stop or process failure.

By the processing shown in FIG. 4, each time the uppermost workpiece W is transported and processed by the workpiece holding robot 10, the position of a new uppermost workpiece W is detected by the image processing device 300, and the transportation and processing of the workpiece W are repeated. When the lowermost workpiece W from among the loaded workpieces W is transported and processed, no workpiece W is detected. Therefore, the image processing device 300 and the robot control device 100 end the processing.

The present invention is not limited to the one or more embodiments described above, and various modifications can be made without departing from the gist of the present invention. A part or all of the image processing device 300 that functions as a workpiece detection device may be composed of a central processing unit (CPU) included in a computer device. The CPU may realize a part or all of the functions of the image processing device 300 by executing a computer program. A part or all of the image processing device 300 may be composed of an integrated circuit. Use of software and hardware is arbitrary.

The present application claims priority based on Japanese Patent Application No. 2019-109550, filed with the Japan Patent Office on Jun. 12, 2019, the entire contents of which are incorporated herein by reference.

The invention claimed is:

1. A workpiece detection device comprising:
   a trapezoid correction unit configured to perform trapezoid correction on photographed image data obtained by photographing one or more workpieces loaded on a mounting place with a monocular camera, an uppermost workpiece of the one or more workpieces being a target workpiece that is held by a gripper of a workpiece holding robot, and the workpiece holding robot including a surface detection sensor;
   a pattern matching unit configured to carry out a first pattern matching between an image of the trapezoid-corrected photographed image data and a first plurality of models that show images of the target workpiece and have a plurality of sizes and a plurality of angles so as to select a model having a size and an angle with a highest degree of matching, each model showing a planar shape of the target workpiece viewed from above, the plurality of sizes being different in a stepwise manner from a smallest size corresponding to a size of the planar shape of the target workpiece in a state in which a single workpiece is arranged on the mounting place to a largest size corresponding to a size of the planar shape of the target workpiece in a state in which a maximum number of workpieces are loaded on the mounting place, and the plurality of angles being angles at which each size of the model is rotated in a plane containing the planar shape;

a primary detection unit configured to detect a position and an angle of the target workpiece from among the loaded workpieces based on the model selected by the pattern matching unit;

an actual load height calculation unit configured to calculate an actual load height of the target workpiece based on a hand height detected by the workpiece holding robot when the gripper is positioned above the target workpiece based on the position and the angle of the target workpiece detected by the primary detection unit; and a secondary detection unit configured to re-detect the position and the angle of the target workpiece based on a model having a size and an angle with a highest degree of matching that the pattern matching unit selects by carrying out a second pattern matching between the image of the trapezoid-corrected photographed image data and a second plurality of models that are either selected from among the first plurality of models based on the actual load height or newly created based on the actual load height, the second plurality of models being less than the first plurality of models.

2. The workpiece detection device according to claim 1, wherein the pattern matching unit defines the second plurality of models by selecting, from among the first plurality of models, models having sizes corresponding to a limited range that is from a height obtained by adding a thickness of the workpiece to the actual load height to a height obtained by subtracting the thickness from the actual load height, or defines the second plurality of models by newly creating a plurality of models in such a manner as to have the sizes within the limited range.

3. A workpiece detection method comprising:
photographing one or more workpieces loaded on a mounting place with a monocular camera, an uppermost workpiece of the one or more workpieces being a target workpiece that is held by a gripper of a workpiece holding robot, and the workpiece holding robot including a surface detection sensor;

performing trapezoid correction on photographed image data obtained by photographing the one or more workpieces with the monocular camera;

selecting a model having a size and an angle with a highest degree of matching by carrying out a first pattern matching between an image of the trapezoid-corrected photographed image data and a first plurality of models that show images of the target workpiece and have a plurality of sizes and a plurality of angles, each model showing a planar shape of the target workpiece viewed from above, the plurality of sizes being different in a stepwise manner from a smallest size corresponding to a size of the planar shape of the target workpiece in a state in which a single workpiece is arranged on the mounting place to a largest size corresponding to a size of the planar shape of the target workpiece in a state in which a maximum number of workpieces are loaded on the mounting place, and the plurality of angles being angles at which each size of the model is rotated in a plane containing the planar shape;

detecting a position and an angle of the target workpiece from among the loaded workpieces based on the model selected by the first pattern matching;

calculating an actual load height of the target workpiece based on a hand height detected by the workpiece holding robot when the gripper is positioned above the target workpiece and the surface detection sensor detects a surface of the target workpiece, based on the detected position and angle of the target workpiece;

selecting a model having a size and an angle with a highest degree of matching by carrying out a second pattern matching between the image of the trapezoid-corrected photographed image data and a second plurality of models that are either selected from among the first plurality of models based on the actual load height or newly created based on the actual load height, the second plurality of models being less than the first plurality of models; and re-detecting the position and the angle of the target workpiece based on the model selected by the second pattern matching.

4. The workpiece detection method according to claim 3, further comprising, at a time of the second pattern matching, selecting, from among the first plurality of models, models having sizes corresponding to a limited range that is from a height obtained by adding a thickness of the workpiece to the actual load height to a height obtained by subtracting the thickness from the actual load height so as to define the second plurality of models, or newly creating a plurality of models in such a manner as to have the sizes within the limited range so as to define the second plurality of models.

5. A control device for controlling a robot control device comprising:
a monocular camera configured to photograph one or more workpieces loaded on a mounting place, an uppermost workpiece of the one or more workpieces being a target workpiece that is held by a gripper of a workpiece holding robot, and the workpiece holding robot including a surface detection sensor; and a computer device connected to the monocular camera, wherein the computer device is configured to perform trapezoid correction on photographed image data obtained by photographing the loaded one or more workpieces with the monocular camera;

to carry out a first pattern matching between an image of the trapezoid-corrected photographed image data and a first plurality of models that show images of the target workpiece and have a plurality of sizes and a plurality of angles so as to select a model having a size and an angle with a highest degree of matching, each model showing a planar shape of the target workpiece viewed from above, the plurality of sizes being different in a stepwise manner from a smallest size corresponding to a size of the planar shape of the target workpiece in a state in which a single workpiece is arranged on the mounting place to a largest size corresponding to a size of the planar shape of the target workpiece in a state in which a maximum number of workpieces are loaded on the mounting place, and the plurality of angles being angles at which each size of the model is rotated in a plane containing the planar shape;

to perform a primary detection to detect a position and an angle of the target workpiece from among the loaded workpieces based on the model selected by the first pattern matching;

to calculate an actual load height of the target workpiece based on a hand height detected by the workpiece holding robot when the gripper is positioned above the target workpiece and the surface detection sensor detects a surface of the target workpiece, based on the position and the angle of the target workpiece detected by the primary detection; and to perform a secondary detection to re-detect the position and the angle of the target workpiece based on a model having a size and an angle with a highest degree of matching by carrying out a second pattern matching between the image of the trapezoid-corrected photographed image data and a second plurality of models that are either selected from among the first plurality of models based on the actual load height or newly created based on the actual load height, the second plurality of models being less than the first plurality of models.

6. The control device for controlling a robot control device according to claim 5, wherein the computer device is configured to define the second plurality of models by selecting, from among the first plurality of models, models having sizes corresponding to a limited range that is from a height obtained by adding a thickness of the workpiece to the actual load height to a height obtained by subtracting the thickness from the actual load height, or to define the second plurality of models by newly creating a plurality of models in such a manner as to have the sizes within the limited range.

* * * * *